United States Patent [19]

Weigand et al.

[11] Patent Number: 4,853,417

[45] Date of Patent: Aug. 1, 1989

[54] PROCESS FOR MANUFACTURING RIGID POLYURETHANE FOAM

[75] Inventors: Eckehard Weigand, Kobe; Yoshinori Kihara, Yamada-Nishi; Masaru Honda, Kobe, all of Japan

[73] Assignee: Sumitomo Bayer Urethane Co., Ltd, Amagasaki, Japan

[21] Appl. No.: 204,053

[22] Filed: Jun. 8, 1988

[30] Foreign Application Priority Data

Jun. 19, 1987 [JP] Japan .................................. 62-154236

[51] Int. Cl.$^4$ .............................................. C08G 18/14
[52] U.S. Cl. .................................... 521/131; 521/159; 521/160; 528/902
[58] Field of Search ........................ 521/159, 160, 131

[56] References Cited

U.S. PATENT DOCUMENTS

| | | | |
|---|---|---|---|
| 3,476,933 | 10/1966 | Mendelsohn | 521/61 |
| 3,492,251 | 1/1970 | Gemeinhardt | 521/160 |
| 3,880,780 | 4/1975 | Ridenour et al. | 521/160 |
| 3,909,464 | 9/1975 | Anorga et al. | 521/160 |
| 3,936,483 | 2/1976 | Gemeinhardt | 252/182.21 |
| 3,994,837 | 11/1976 | Kan et al. | 260/2.5 BF |
| 4,359,541 | 11/1982 | Patton, Jr. et al. | 521/137 |
| 4,552,902 | 11/1985 | Nafziger et al. | 521/129 |
| 4,698,371 | 10/1987 | Werner et al. | 521/131 |

FOREIGN PATENT DOCUMENTS 3436098 4/1986 Fed. Rep. of Germany.
1267011 3/1972 United Kingdom.

*Primary Examiner*—Maurice J. Welsh
*Assistant Examiner*—L. Henderson
*Attorney, Agent, or Firm*—Gene Harsh; Joseph C. Gil

[57] ABSTRACT

Rigid polyurethane foams are obtained by reacting an isocyanate-reactive component containing at least two isocyanate-reactive hydrogen atoms, having a molecular weight of from 32 to 10,000 or a mixture thereof, with a polyisocyanate composition comprising (a) 30 to 70 pbw of polymethylene polyphenyl polyisocyanate with an iscocyanate content of from 29 to 32%, (b) 30 to 70 pbw of a compound having 30 to 42% by weight isocyanate content obtained by reacting 2,4- and/or 2,6-tolylene diisocyanate with an active hydrogen containing compound, thereafter initiating a reaction in the presence of trimerization catalyst, if necessary diluted with 2,4- and/or 2,6-tolylene diisocyanate, (c) 0 to 30 pbw of other isocyanate compounds in the presence of water and/or organic blowing agents, catalysts and surfactants.

5 Claims, No Drawings

PROCESS FOR MANUFACTURING RIGID POLYURETHANE FOAM

Many isocyanates are useful for the production of rigid foam (compare: Polyurethane Handbook, Dr. G. Oertel, ed., Carl Hanser Verlag Munich 1983, chapter 6.1).

Most frequently, polymethylene polyphenyl polyisocyanate (hereinafter polymeric MDI) and prepolymers from 2,4- and/or 2,6-tolylene diisocyanate (hereinafter TDI) are used.

Polymeric MDI is imparting good cure properties to a rigid foam system, but a comparatively high degree of over-charging is necessary for filling cavities with foam of evenly distributed properties. Furthermore, it is usually difficult to achieve low k-factors.

TDI prepolymers are the state of the art for filling cavities with rigid foam at comparatively low overcharging. They are also helpful for achieving low k-factors, but the resulting foams are rather slowly curing.

Mixtures of polymeric MDI and TDI prepolymers combine the above mentioned advantages while limiting the disadvantages of the individual isocyanates, but at low densities, the resulting foams are insufficient with respect to compression strength and low temperature dimensional stability.

TDI which is modified by heat treatment, containing carbodiimid and/or uretonimin structures (hereinafter crude TDI), in a blend with polymeric MDI is reported to show advantages for freeze stability and strength of the resulting foams at low densities. But standardization of the quality of crude TDI is difficult and the use of crude TDI often results in coarse celled foams.

In view of the economical situation of e.g. the refrigerator manufacturers it has become increasingly important to supply a solution to the problem how to produce rigid polyurethane foam with reasonable cure times and good k-factors at the lowest possible density, showing sufficient compression strength and low temperature dimensional stability without the limitations which arise from the use of crude TDI.

The object of the present invention is to provide a solution to the problem described above.

The present invention relates to a process for manufacturing rigid polyurethane foam which is characterized by reacting an isocyanate-reactive component containing at least two isocyanate-reactive hydrogen atoms, having a molecular weight of from 32 to 10,000 or a mixture thereof, with a polyisocyanate composition comprising (a) 30 to 70 pbw of polymethylene polyphenyl polyisocyanate "polymeric MDI" with an isocyanate content of from 29 to 32%, (b) 30 to 70 pbw of a compound having 30 to 42% by weight isocyanate content obtained by reacting 2,4- and/or 2,6-tolylene diisocyanate with an active hydrogen containing compound, thereafter initiating a reaction in the presence of trimerization catalyst, if necessary diluted with 2,4- and/or 2,6-tolylene diisocyanate, (c) 0 to 30 pbw of other isocyanate compounds in the presence of water and/or organic blowing agents, and optionally catalysts, surfactants and other additives.

Preferred is a process for manufacturing rigid polyurethane foam which is characterized in using a polyhydric alcohol having a molecular weight of from 60 to 800 as the active hydrogen containing compound in paragraph (b).

Furthermore preferred is a process for manufacturing rigid polyurethane foam which is characterized in using 2,2,4-trimethyl pentane-1,3-diol and/or 2-ethylhexane-1,6-diol as the active hydrogen containing compound in paragraph (b).

Also preferred in a process for manufacturing rigid polyurethane foam which is characterized in using the active hydrogen containing compound in paragraph (b) in an amount sufficient for decreasing the isocyanate content of 2,4- and/or 2,6-tolylene diisocyanate by 3 to 13%.

According to the invention a process for manufacturing rigid polyurethane foam is preferred, which is characterized in using a compound obtained by reacting 2,4- and/or 2,6-tolylene diisocyanate with an active hydrogen containing compound according to paragraph (b), thereafter initiating a reaction in the presence of trimerization catalyst until the isocyanate content reaches the desired level of 30 to 42% b.w. and stopping said reaction.

Also preferable is a process for manufacturing rigid polyurethane foam which is characterized in using a compound obtained by reacting 2,4- and/or 2,6-tolylene diisocyanate with an active hydrogen containing compound according to paragraph (b), thereafter initiating a reaction in the presence of trimerization catalyst until the isocyanate content decreases below the desired level and stopping said reaction, then diluting the reaction product with 2,4- and/or 2,6-tolylene diisocyanate.

Similar polyisocyanate compositions are described in the German Patent No. 1 929 034 for the production of flexible polyurethane foams.

The materials used for producing the rigid polyurethane foams are known in the art.

As starting components, aliphatic, cycloaliphatic, araliphatic, aromatic and heterocyclic polyisocyanates of the type described, for example, by W. Siefken in Justus Liebigs Annalen der Chemie, 562, pages 75 to 136, may be used as other isocyanate compounds (c). Examples include those corresponding to the following formula $$Q(NCO)_n$$

in which m=2-4, preferably 2, and

Q is an aliphatic hydrocarbon radical containing from 2 to 18 and preferably from 6 to 10 C-atoms, a cycloaliphatic hydrocarbon radical containing from 4 to 15 and preferably from 5 to 10 C-atoms, an aromatic hydrocarbon radical containing from 6 to 15 and preferably from 6 to 13 C-atoms, or an araliphatic hydrocarbon radical containing from 8 to 15 and preferably from 8 to 13 C-atoms.

Examples also include those polyisocyanates which are described on pages 10–11 of German Offenlegungsschrift No. 2,832,253.

In general it is particularly preferred to use the commercially available polyisocyanates, such as 2,4- and 2,6-tolylene diisocyanate and mixtures of these isomers ("TDI"); polyphenyl-polymethylene polyisocyanates of the type obtained by phosgenating aniline-formaldehyde condensates ("polymeric MDI"); and polyisocyanates containing carbodiimide groups, urethane groups, allophanate groups, isocyanurate groups, urea groups or biuret groups ("modified polyisocyanates"). Particularly preferred are those modified polyisocyanates which are derived from 2,4- and/or 2,6-tolylene diisocyanate and from 4,4'- and/or 2,4'-diphenylmethane diisocyanate.

As further starting components, compounds containing at least two isocyanate-reactive hydrogen atoms and having molecular weights of generally from 400 to 10,000 ("isocyanate-reactive component") are used. In addition to compounds containing amino groups, thiol groups or carboxyl groups, such compounds are preferably compounds containing from 2 to 8 hydroxyl groups, especially those having molecular weights of from 1,000 to 8,000 and preferably from 2,000 to 4,000. Examples of such hydroxy containing materials are polyesters, polyethers, polythioethers, polyacetals, polycarbonates and polyester amides containing at least 2, generally from 2 to 8, but preferably from 2 to 4 hydroxyl groups, of the type known per se for the production of homogeneous and cellular polyurethanes and described, for example, in German Offenlegungsschrift No. 2,832,253, pages 11-18.

As optional starting components, compounds containing at least two isocyanate-reactive hydrogen atoms and having molecular weights of from 32 to 400 ("isocyanate-reactive component") are used. Such compounds include compounds containing hydroxyl groups and/or amino groups and/or thiol groups and/or carboxyl groups, preferably compounds containing hydroxyl groups and/or amino groups which are used as chain extenders or crosslinking agents. These compounds generally contain from 2 to 8 and preferably from 2-4 isocyanate-reactive hydrogen atoms. Examples of the compounds in question can be found on pages 19-20 of the German Offenlegungsschrift No. 2,832,253.

Water and/or readily organic blowing agents of the type generally known and used in the polyurethane art are also used herein.

Optionally, auxiliaries and additives may be added. Examples include
  (a) catalysts known per se, generally in quantities of up to 10% by weight, based on the "isocyanate-reactive component" of a molecular weight of 32-10,000,
  (b) surface-active additives, such as emulsifiers and foam stabilizers,
  (c) reaction retarders, for example acidic-reacting substances, such as hydrochloric acid or organic acid halides; cell regulators known per se, such as paraffins or fatty alcohols or dimethyl polysiloxanes; pigments or dyes and flame proofing agents known per se, for example tris-chloroethyl phosphate, tricresyl phosphate; stabilizers against the effect of ageing and weather, plasticizers and fungistatic and bacteriostatic agents and fillers, such as barium sulphate, Kieselguhr, carbon black or whiting.

These auxiliaries and additives which may optionally be used are described, for example, in German Offenlegungsschrift No. 2,732,292, pages 21-24 and in Kunststoff-Handbuch, Vol. VII, by Vieweg and Höchtlen, Carl-Hanser-Verlag, Munich, 1966, for example on pages 103-113.

In the process of the present invention, the reaction constituents are reacted by the known one-stage process, the prepolymer process or the semi-prepolymer process, often with the aid of mechanical apparatus, such as the apparatus described in U.S. Pat. No. 2,764,565. Information about processing apparatus which is suitable according to the present invention is also found in the Kunststoff Handbuch Vol. VII, published by Vieweg and Hochtlen, Carl-Hanser-Verlag, Munich 1966 e.g. on pages 121 to 205.

To produce the foam of the present invention, foaming may be carried out in closed molds. According to this method, the reaction mixture is introduced into a mold. Metals, such as aluminum, or plastics, such as epoxide resins, or wood are suitable materials for the mold. The foamable reaction mixture foams in the mold and forms the molding. In situ foaming may be carried out in such a way that the molding has a cellular structure on the surface thereof, or it may also be carried out in a manner such that the molding has a compact skin and a cellular core. The process of the present invention may be carried out by introducing the foamable reaction mixture into the space between suitable surface materials, held in place inside a suitably constructed mold, to form a sandwich type molding. Suitable surface materials are e.g. sheets of metals like steel or aluminum, optionally coated or painted, or sheets of plastic materials like ABS, HIPS, or others, well known to those skilled in the art.

The process of the present invention may be carried out by introducing just enough foamable reaction mixture into the mold so that the foam which is foamed fills the mold exactly. The process may also be carried out by introducing more foamable reaction mixture into the mold than is required to fill the mold cavity with foam. In the latter case, the process is carried out with "overcharging". This latter method is described in U.S. Pat. Nos. 3,178,490 and 3,182,104.

In many cases, known external mold-release agents, such as silicone oils, may also be used in situ foaming. So-called "internal mold-release agents" may also be used, optionally with external mold release agents, as is disclosed, for example, in German Offenlegungsschriften No. 2,121,670 and 2,307,589.

Foams may, of course, also be produced by block foaming or by the known laminator process or they may be cast, produced on-site by the processes of pouring, layer-on-layer or spray-on.

The foams of the present invention may be used, for example, as roof insulating boards, cladding panels, flooring elements, for the insulation of containers, pipelines, appliances like e.g. refrigerators or freezers, show cases etc. and for sealing and insulating roofs and walls etc.

The following examples are intended to illustrate the present invention in more detail, without in any way limiting the scope of the invention.

REFERENTIAL EXAMPLE

Into the flask equipped with a stirrer, a thermometer and a pipe, feeding nitrogen gas, 752 g of 80/20 mixture of 2,4- and 2,6-tolylene diisocyanate was fed and heated to 60° C., then 36.2 g of 2,2,4-trimethylpentane-1,3-diol was added within 30 minutes. The reaction mixture was kept at 100° C. for one hour. A sample taken then showed the isocyanate content of 43.3%. Thereafter, 1.5 g of a 1/1 mixture of 2,4,6-tris (N,N-dimethylaminomethyl) phenol and xylene was added and the reaction mixture was kept at 100° C. for 6 hours. The isocyanate content decreased to 36.1%. The reaction was stopped by adding 1.9 g of methyl ester of p-toluene sulphonic acid. The resulting product showed the absorption at 1710 cm$^{-1}$ in IR spectrum and the isocyanate content of 36.0%.

WORKING EXAMPLES AND COMPARISON EXAMPLES

Adjusting the quantity of freon R-11 so as to produce foams having a density of 23, 24 or 25 kg/m$^3$, polyol compositions were prepared and added to polysiocyanate compositions in a portion to make the equivalent ratio of isocyanate groups to hydroxyl groups at 1.05. The mixture was stirred by high speed labo-mixer (5,000 rpm) for 5 seconds and poured into a box of 30 cm length, 15 cm width and 20 cm depth covered with inner facings of paper.

After one day, cubes of 10 cm×10 cm×10 cm were cut from the foam and stored at −25° C. for 5 days for the measurement of dimensional changes. The results are shown in the Table.

The reaction components used in the examples are as follows:

Polyol Composition A

The following ingredients are homogeneously mixed.
(1) 65 parts by weight of polyether polyol obtained by adding propylene oxide to sucrose and propylene glycol having OH value of 470 mgKOH/g and a viscosity of 15,000 mPa.s
(2) 25 pbw of polyether polyol obtained by adding propylene oxide to glycerine, having OH value of 400 mgKOH/g and a viscosity of 350 mPa.s
(3) 10 pbw of polyether polyol obtained by adding propylene oxide to ethylene diamine, having OH value of 630 mgKOH/g and a viscosity of 20,000 mPa.s
(4) 2 pbw of tetramethyl hexamethylene diamine
(5) 2 pbw of silicone stabilizer
(6) 2 pbw of water.

Polyisocyanate Composition B

A mixture of 50 pbw of the said compound shown in the referential example and 50 pbw of polymeric MDI, having an isocyanate content of 33.5% in total.

Polyisocyanate Composition C

Polymeric MDI having an isocyanate content of 31.0%.

Polyisocyanate Composition D

A mixture of 50 pbw of prepolymer obtained by reacting 43 pbw of 80/20-TDI with 7 pbw of polyether polyol which was addition product of propylene oxide to initiator consisting of sugar and propylene glycol, and 50 pbw of polymeric MDI, having an isocyanate content of 32.5% in total.

Polyisocyanate Composition E

A mixture of 50 pbw of crude TDI having an isocyanate content of 36% and 50 pbw of polymeric MDI, having an isocyanate content of 33.5% in total.

In the working examples, the resulting foam was good enough showing a small dimensional change less than 2% at the density as low as 23 Kg/m$^3$. In the comparison example 1 and 2, the resulting foam showed a large dimensional change more than 5% at the lower density. The comparison example 3 shows that the resulting foam had coarse cells in the center so as to be unsuitable for insulation materials.

TABLE

| | Working Example | | | Example 1 | | |
|---|---|---|---|---|---|---|
| Polyol Composition | A | | | A | | |
| Polyisocyanate Composition | B | | | C | | |
| Foam Density (Kg/m$^3$) | 23 | 24 | 25 | 23 | 24 | 25 |
| Compression strength (Kg/cm$^2$) | — | — | 1.03 | — | — | 0.91 |
| Dimensional change* | S | S | S | L | L | S |
| Thermal conductivity (Kcal/mhr° C.) | — | — | 0.0153 | — | — | 0.0158 |

| | Comparision Example 2 | | | Comparison Example 3 |
|---|---|---|---|---|
| Polyol Composition | A | | | A |
| Polyisocyanate Composition | D | | | E |
| Foam Density (Kg/m$^3$) | 23 | 24 | 25 | Coarse Cells |
| Compression strength (Kg/cm$^2$) | — | — | 1.01 | |
| Dimensional change* | L | S | S | |
| Thermal conductivity (Kcal/mhr° C.) | — | — | 0.0152 | |

*S means small, L means large

We claim:
1. A process for manufacturing rigid polyurethane foam comprising reacting an isocyanate-reactive component containing at least two isocyanate-reactive hydrogen atoms and having a molecular weight of from 32 to 10,000 or a mixture thereof, with a polyisocyanate composition comprising
   (a) 30 to 70 parts by weight of polymethylene polyphenyl polyisocyanate having an isocyanate content of from 29 to 32%,
   (b) 30 to 70 parts by weight of a compound having 30 to 42% by weight isocyanate content obtained by reacting 2,4- and/or 2,6-tolylene diisocyanate with a polyhydric alcohol having a molecular weight of from 60 to 800, thereafter initiating a reaction in the presence of a trimerization catalyst, and if necessary, diluting the resultant product with 2,4-and/or 2,6-tolylene diisocyanate,
   (c) 0 to 30 parts by weight of other isocyanate compounds,
in the presence of water and/or organic blowing agents, catalysts and surfactants.

2. The process of claim 1 wherein said polyhydric alcohol is 2,2,4-trimethyl pentane-1,3-diol and/or 2-ethyl-hexane-1,6-diol.

3. The process of claim 1 wherein said polyhydric alcohol is used in an amount such that the isocyanate content of the 2,4- and/or 2,6-tolylene diisocyanate is decreased by 3 to 13% by weight.

4. The process of claim 1 wherein said component (b) is prepared by reacting said tolylene diisocyanate with said polyhydric alcohol, initiating a reaction in the presence of said trimerization catalyst until the isocyanate content reaches the desired level and stopping the reaction.

5. The process of claim 1 wherein said component (b) is prepared by reacting said tolylene diisocyanate with said polyhydric alcohol, initiating a reaction in the presence of said trimerization catalyst until the isocyanate content decreases below the desired level, stopping said reaction, and diluting the resultant product with 2,4-and/or 2,6-tolylene diisocyanate.

* * * * *